United States Patent [19]

Herzl et al.

[11] 4,052,895

[45] Oct. 11, 1977

[54] OBSTACLE ASSEMBLY FOR VORTEX-TYPE FLOWMETER

[75] Inventors: Peter J. Herzl, Morrisville; Warren Strohmeier, Warminster, both of Pa.

[73] Assignee: Fischer & Porter Co., Warminster, Pa.

[21] Appl. No.: 758,849

[22] Filed: Jan. 12, 1977

[51] Int. Cl.$^2$ ............................................. G01F 1/32
[52] U.S. Cl. ............................................... 73/194 VS
[58] Field of Search ................................... 73/194 VS

[56] References Cited

U.S. PATENT DOCUMENTS

| 3,732,731 | 5/1973 | Fussell, Jr. | 73/194 |
|---|---|---|---|
| 3,823,610 | 7/1974 | Fussell, Jr. | 73/194 |
| 3,948,097 | 4/1976 | Kurita et al. | 73/194 |
| 3,972,232 | 8/1976 | Miller et al. | 73/194 |
| 3,996,796 | 12/1976 | Adler | 73/194 |
| 4,003,253 | 1/1977 | Yard et al. | 73/194 |

*Primary Examiner*—Herbert Goldstein

[57] ABSTRACT

A flowmeter of the vortex type in which an obstacle assembly mounted in a flow tube of relatively small diameter causes vortices to be shed at a frequency which is a function of flow rate. The assembly includes a block fixedly mounted across the flow tube at right angles to the direction of flow, the block having a substantially square cross-section to present a flat face to the incoming fluid. The upper and lower rear corners of the block are bevelled to define a flat rear face of reduced area, the resultant block configuration acting to enhance the shedding characteristics of the assembly and to produce substantially linear flow rate measurements at low Reynolds numbers.

6 Claims, 5 Drawing Figures

$A/D \simeq .15$ TO $.35$
$C \simeq A$
$B \simeq \frac{2}{3} C$
$B' \simeq \frac{1}{3} C$
$E \simeq 1$ TO $\frac{1}{2} D$
$F \simeq \frac{1}{4}$ WAVE LENGTH SHEDDING FREQ.

$A/D \simeq .15\ TO\ .35$
$C \simeq A$
$B \simeq 2/3\ C$
$B' \simeq 1/3\ C$
$E \simeq 1\ TO\ 1\ 1/2\ D$
$F \simeq 1/4\ WAVELENGTH\ SHEDDING\ FREQ.$

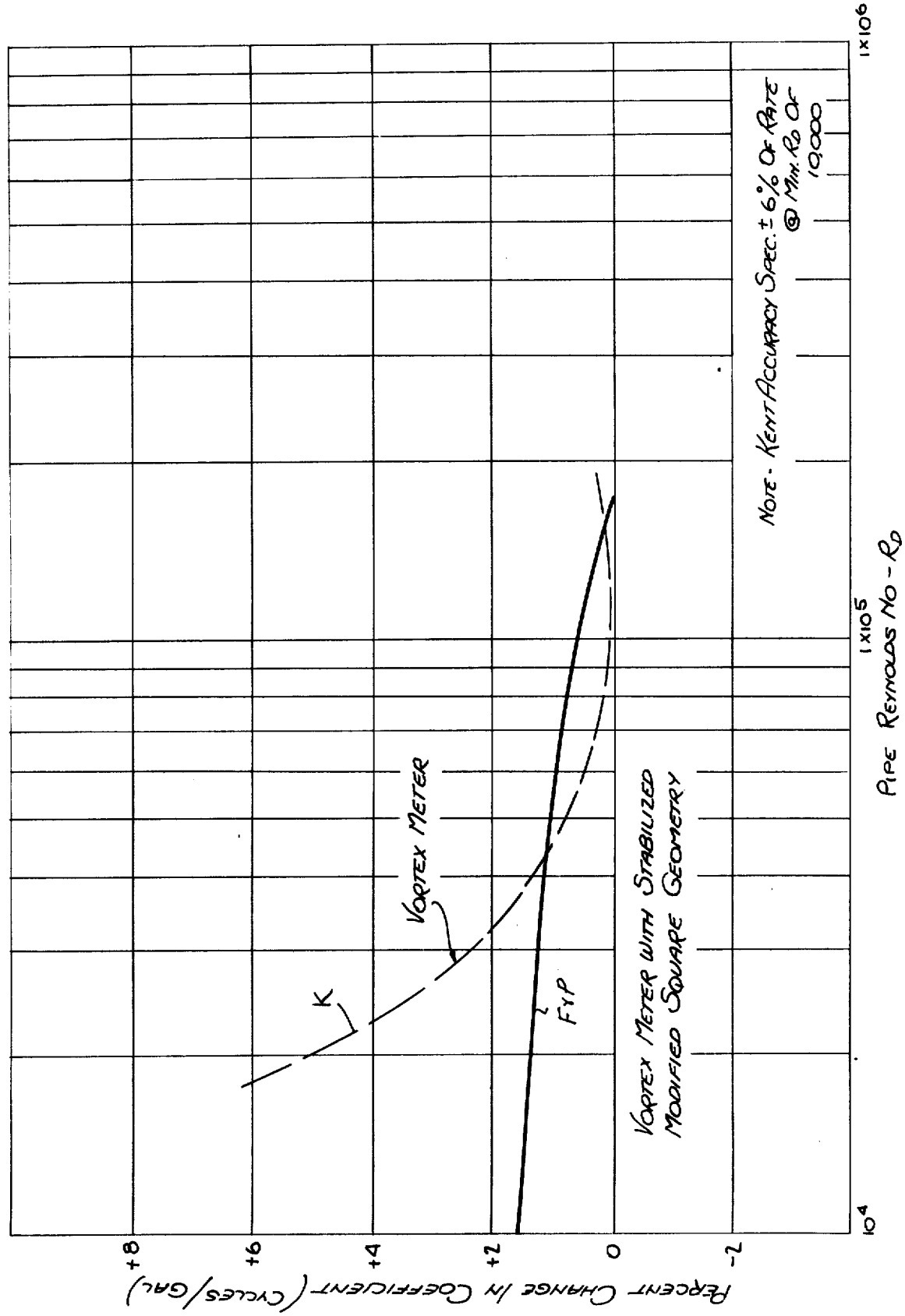

OBSTACLE ASSEMBLY FOR VORTEX-TYPE FLOWMETER

BACKGROUND OF INVENTION

This invention relates generally to flowmeters of the vortex-shedding type and more particularly to an improved shedding body for meters of this type.

It is well known that under certain circumstances, the presence of an obstacle in a flow conduit will give rise to periodic vortices. For small Reynolds numbers, the downstream wake is laminar in nature, but at increasing Reynolds numbers, regular vortex patterns are formed. These patterns are referred to as Karman vortex streets. The frequency at which vortices are shed in a Karman vortex street is a function of flow rate.

An improved form of vortex-type flowmeter is disclosed in the Burgess U.S. Pat. No. 3,589,185 wherein the signal derived from the fluid oscillation is relatively strong and stable to afford a favorable signal-to-noise ratio insuring accurate flow-rate information over a broad range. In this meter, the obstacle assembly mounted in the flow conduit is constituted by a block positioned across the conduit with its longitudinal axis at right angles to the direction of fluid flow, a strip being similarly mounted behind the block and being spaced therefrom to define a gap which serves to trap Karman vortices and to strengthen and stabilize the vortex street. This vortex street is sensed to produce a signal whose frequency is proportional to flow rate.

In Herzl U.S. Pat. No. 3,867,839, the obstacle assembly for the vortex type meter disclosed therein also makes use of a block mounted across the flow conduit, but this block has a triangular cross-section with its apex being pointed toward the incoming fluid. Obstacle bodies having other cross-sectional shapes including a circular shape are disclosed in the Bird U.S. Pat. No. 3,116,639, in the Rodley U.S. Pat. No. 3,572,117, and in the pending Herzl-Metzger application Ser. No. 670,998, filed Mar. 26, 1976.

The advantage of a vortex-shedding body having a cylindrical form is that it is physically strong, mechanically stable and offers adequate internal space within which to mount various sensing systems. But these advantages are offset by the fact that a cylinder produces an irregular shedding action and does not have a very large operating range of constant meter coefficients, to say nothing of a number of other problems which militate against the use of a cylindrical shedding body.

It is known that flat plates afford the strongest shedding phenomenon. On the other hand, flat plates are physically weak and do not provide sufficient internal space for mounting sensing systems. For example, in the Herzl U.S. Pat. No. 3,946,608, the obstacle body has a trapezoidal cross-section, and it becomes possible with this shape to mechanically transmit the vibrations of a deflectable section cantilevered from the rear of this body to an external coupling point by means of a rod passing through an internal duct in the body. As a practical matter, this is difficult to do with a flat plate.

As pointed out previously, an obstacle having a circular cross-section is the most efficient form the standpoint of strength and internal volume to accommodate a sensing system. The next most efficient shape from the same standpoint is the square or rectangle. However, the circular shape is hydraulically poor, while the square or rectangular shape, though better, is not hydraulically a very good vortex shedder.

The problems encountered with obstacle assemblies of the type heretofore known are aggravated in flowmeters of relatively small size. Thus only one company has been able to produce a vortex-type flowmeter with a flow tube diameter of less than two inches, the meter including a flat plate obstacle. But the limitations imposed on the sensing system by this obstacle shape and the concomitant hydraulic problems are such that these meters have been marginal in operation.

SUMMARY OF INVENTION

In view of the foregoing, it is the main object of this invention to provide an obstacle assembly for a small diameter vortex-shedding flowmeter which is both mechanically and hydraulically efficient, whereby the meter is capable of shedding effectively at low Reynolds numbers and affords a meter linearity of better than ± 1%.

More particularly, it is an object of this invention to provide an obstacle assembly of the above-noted type whose internal volume is more than adquate to accommodate a sensing system.

Briefly stated, these objects are accomplished in a vortex-type flowmeter having an obstacle assembly mounted in a flow tube, which assembly includes a block positioned across the tube at right angles to the direction of fluid flow and a sensing vane cantilevered behind the block by means of a resilient beam, whereby vortices shed by the block produce fluidic oscillations which cause the vane to vibrate at a frequency proportional to flow rate.

The vibrations of the vane are mechanically transmitted to a point outside the flow tube by a rod extending through the beam and linked to a probe at right angles thereto and extending through the block to an external sensing head. This head is engageable by a force sensor to provide a signal indicative of flow rate.

The flat front face of the block is presented to the incoming fluid, the rear corners of the block being bevelled to define a flat rear face of reduced area. The resultant block configuration acts to enhance the shedding characteristics of the obstacle assembly and to produce substantially linear flow rate measurements at low Reynolds numbers.

OUTLINE OF DRAWING

For a better understanding of the invention as well as other objects and further features thereof, reference is made to the following detailed description to be read in conjunction with the accompanying drawings, wherein.

Figure 1:
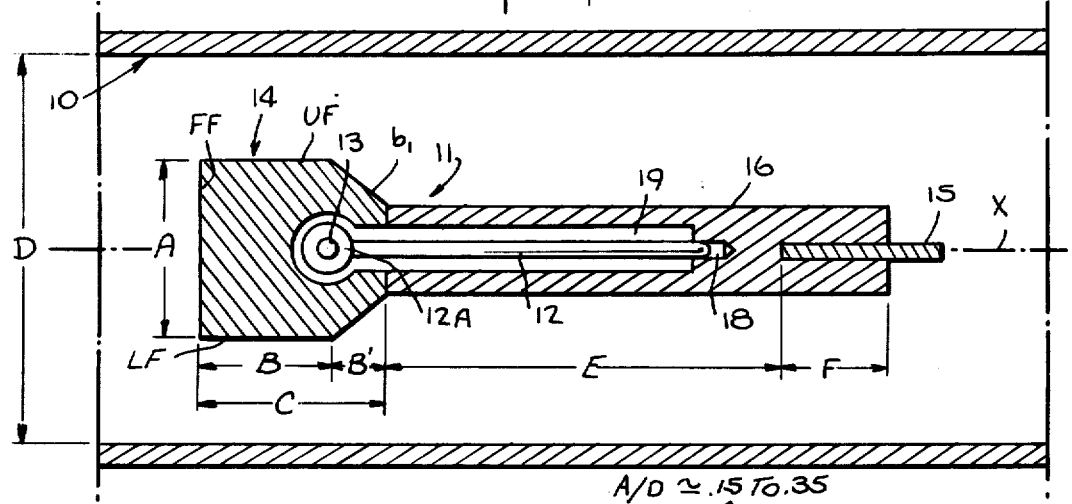
FIG. 1 is a longitudinal section taken through a vortex flowmeter including an obstacle assembly in accordance with the invention.
Figure 2:
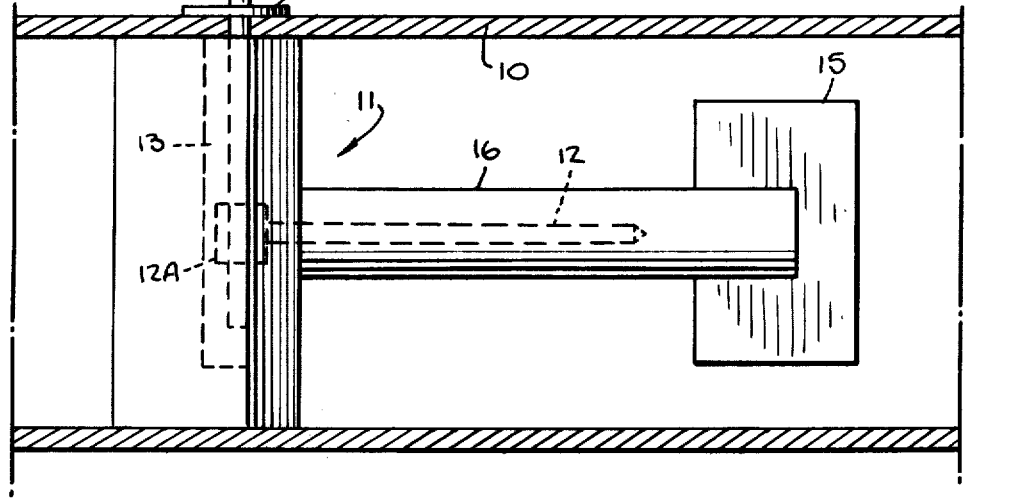
FIG. 2 is a section taken through the meter in the plane indicated by line 2—2 in FIG. 1.
Figure 3:
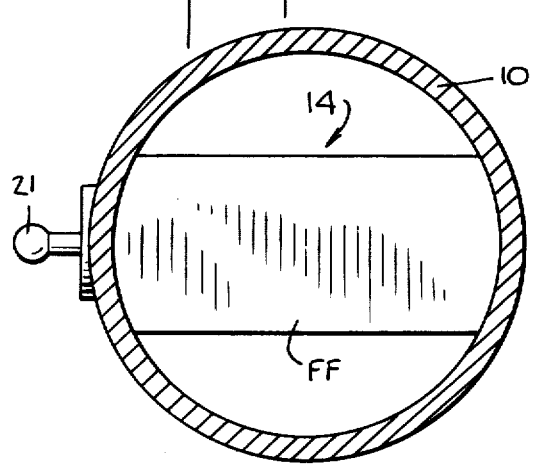
FIG. 3 is a front view of the meter.
Figure 4:
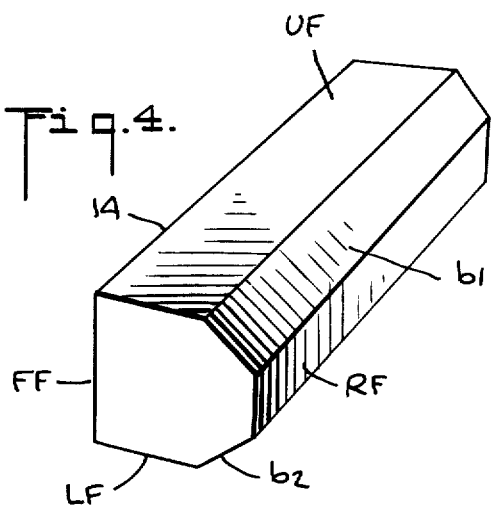

FIG. 4 separately illustrates, in perspective, the block included in the obstacle assembly; and FIG. 5 is a graph comparing the characteristics of a prior art vortex-type flowmeter with a meter having an obstacle assembly in accordance with the invention.

DESCRIPTION OF INVENTION

In the vortex-type flowmeter of the type disclosed in the Herzl U.S. Pat. No. 3,867,839, there is provided an obstacle assembly adapted to generate strong stabilized fluidic oscillations causing a deflectable section of the assembly to vibrate at a corresponding rate. These mechanical vibrations are sensed to produce a signal whose frequency is proportional to the flow rate of the fluid. In the flowmeter disclosed in this patent, the mechanical vibrations are sensed by one or more strain gauges mounted within the deflectable section to produce periodic changes in electrical resistance, resulting in a signal whose frequency is proportional to the vibratory rate and hence to the flow rate of the fluid.

In the flowmeter illustrated in FIGS. 1 to 4, the vibrations of a deflectable section of the obstacle assembly are detected by a force sensor which is external to the flow tube. It is to be understood, however, that while the invention is illustrated in an external sensor arrangement in order to show how the obstacle assembly provides adequate space for a sensing system, in its broadest aspect, the invention, which is primarily concerned with the geometry of the obstacle assembly, is applicable to internal as well as external sensor arrangements for vortex type flowmeters and to vortex meters with other sensing expedients, such as thermistors, pressure sensors, etc.

FIGS. 1 to 4 illustrate a flowmeter having an obstacle assembly in accordance with this invention, the meter including a flow tube 10 interposed in the water line for a waterflood system or in any other environment in which it is necessary to conduct an occasional test of flow rate to determine whether proper flow conditions exist. For this purpose, the flow tube may be provided with end flanges to facilitate coupling to the line.

Mounted within flow tube 10 is an obstacle assembly generally designated by numeral 11, the assembly including a deflectable section which is responsive to the Karman vortex street and is caused to vibrate microscopically at a frequency which is proportional to flow rate. Incorporated in the obstacle assembly is a vibration transmitter composed of a rod 12 and a probe 13.

Flow tube 10, which is shown as having a circular cross-section, includes an inlet 10A into which the fluid to be metered is introduced. The flow impinges on obstacle assembly 11 which acts to divide the flow around the obstacle, producing fluidic perturbations in the form of a Karman vortex street. Obstacle assembly 11 is constituted by a transversely-mounted front section 14 in the form of a block and a rear section 15 mounted behind the front section by a cantilever support in the form of a flexible beam 16.

Front section 14 is a block having a generally square cross-section which is uniform throughout the long axis of the block, this axis being perpendicular to the flow axis X of the flow tube. The extremities of the front section are secured to the wall of the tube whereby the front section is held fixedly within the tube.

Rear section 15 is constituted by a rectangular vane which is maintained by bearing 16 in spaced relation to the front section, the plane of the vane being parallel to the flat upper and lower faces of front section block 14. The rear section shape is such as to interfere with the vortex street, and the gap 18 established between the front section block and the rear section vane tends to trap the vortices and to strengthen and stabilize the vortex street produced thereby.

Because rear section 15 is cantilevered by means of flexible beam 16, it is deflectable. The beam, though bendable, has sufficient rigidity so as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. The downstream vane section of the assembly carries out two functions, for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic oscillation, so that metal fatigue of the supporting beam, as a result of the vibrating action, is minimized and failures do not arise after prolonged operation.

It is important to note that the magnitude of deflection is not of primary importance, for the flow rate information is given by the frequency, not the amplitude of vibration. Hence while the deflection magnitude is made extremely small in order to provide an acceptable fatigue life, this does not militate against a readable output of varying frequency.

The minute vibrations of the deflectable rear section of the obstacle assembly are sensed outside of flow tube 10 rather than within the tube. For this purpose, the vibrations are conveyed by the vibration transmitter, including rod 12, whose rear portion is socketed within a bore 18 within beam 16, the bore extending to a point adjacent deflectable section 15. The front portion of rod 12 lies freely within a relatively large diameter, longitudinally-extending bore 19 communicating with the smaller diameter bore 18 and extending well into front section 14.

Rod 12 terminates in a collar 12A which encircles the end portion of probe 13 to provide a link between the rod and the probe. Probe 13 extends through a longitudinal passage in front section 14 and projects through an opening in the wall of flow tube 10 which is covered by a flexible diaphragm 20, probe 13 terminating in a coupling head 21.

Any force sensor 22 capable of responding to a force developed at coupling head 21 to produce a corresponding electrical signal may be used to provide a signal indicative of flow rate. A preferred sensor for this purpose is a quartz piezoelectric load cell, such as the "Piezotron" load cell (922 series) manufactured by Kistler Instrument Company of Redmond, Wash. This is a very stiff, rugged force sensor responsive to minute incremental forces and usable in environments contaminated by dust, dirt or moisture without any adverse effect on signal transmission.

As noted previously, an obstacle body having a square cross-section is a mechanically efficient shape and provides sufficient internal volume to accommodate the rod and probe for transmitting the vibrations to an external sensing point. But a square cross-sectional shape affords a poor shedding action. It has been found, however, that when the block is modified in the manner shown in FIGS. 1 and 4, the shedding characteristics are significantly altered and the body becomes a superb shedder. This shedder is particularly advantageous in small vortex-type flowmeters (1 to 8 inch internal diameter).

This modification will now be explained. The front section block having a square cross-section is provided with a flat front face FF which has a height A, a flat rear face RF and flat upper and lower faces UF and LF, respectively.

Front face FF is presented to the incoming fluid stream, and rear face RF is parallel thereto, the two faces being at right angles to the direction of flow. The distance between front face FF and rear face RF is represented by symbol C, and this distance is about equal to height A. The rear corners of block 14 are bevelled, the upper and lower bevels $b_1$ and $b_2$ lying within a rear zone B' which is about ⅓ the distance C, so that the front zone B which encompasses the upper and lower flat face is ⅔rds distance C.

The angle of bevels $b_1$ and $b_2$ is not critical and may be in the range of about 45° to 60°. As a consequence, the area of rear face RF is small compared to the area of front face FF. The size of height A of the block relative to the internal diameter D of the flow tube is not critical and lies in the range of about 0.15 to 0.35. The distance E along beam 16 between rear face RF of the block and the leading edge of vane 15 is about 1 to 1¼ D, whereas the width F of vane 15 is about ¼ the wavelength of the shedding frequency.

It has been found that with a shedding arrangement having the geometric relationships set forth hereinabove, meter linearities of better than ± 1% can be achieved at Reynolds numbers as low as 7000. Because the A to D relationship is not critical, this allows much greater freedom in meter optimization. In contradistinction, one well-known vortex-type flowmeter manufacturer advertises an accuracy of ± 6% at a Reynolds number of 10,000, while another only specifies meter accuracies above a Reynolds number above 17,000, presumably because it is altogether unsatisfactory at lower numbers.

Referring now to FIG. 5, there is shown a performance comparison between a commercially available "Kent" meter whose obstacle body has a rectangular geometry, with a Fischer & Porter meter in accordance with the invention whose obstacle block has a square cross-section with bevelled rear corners.

It will be evident from curve K, which represents the characteristics of a Kent instrument, and curve F&P, which represents the minimum flow characteristics of a new one-inch instrument in accordance with the invention manufactured by the Fischer & Porter Company, the assignee herein, that the F&P geometry is far superior to K's at low Reynolds numbers. This is especially important in smaller meter sizes or when the meters are used in oil.

The Kent Company publishes the following vortex-flowmeter accuracy figures:

± 0.5% for Reynolds numbers  30,000
± 2.2% for Reynolds numbers  20,000
± 6.0% for Reynolds numbers  10,000

The significance of these figures can best be appreciated when one realizes that in a one-inch flowmeter at 2.75 GPM with water at 1cSt viscosity, a Reynolds number of 8690 exists. It will be obvious that with a Kent instrument, a reasonable degree of accuracy is not attainable with this low Reynolds number, whereas with a meter in accordance with the invention, accurate readings are obtained.

While there has been shown and described a preferred embodiment of an obstacle assembly for vortex-type flowmeter in accordance with the invention, it will be appreciated that many changes and modifications may be made therein without, however, departing from the essential spirit thereof.

I claim:

1. A vortex-type flowmeter in which a fluid to be metered is conducted through a flow tube of relatively small diameter having a obstacle assembly therein to cause vortex shedding at a frequency which is a function of flow rate, said assembly including a block fixedly mounted across the tube at right angles to the direction of flow, the block having a flat front face which is presented to the incoming fluid and a flat rear face parallel thereto which is spaced from the front face by a distance equal to the height of the front face, the block having upper and lower side surfaces with bevelled rear corners connecting the side surfaces to the flat rear face, the bevelled rear corners occupying a rear zone which lies in a zone about one-third the distance between the rear of the front faces of the block, the resultant block configuration acting to enhance the shedding characteristics of the assembly and to produce substantially linear flow rate measurements at low Reynolds numbers.

2. A flowmeter as set forth in claim 1, wherein said front face has a height which is about 0.15 to 0.35 of the internal diameter of the tube.

3. A flowmeter as set forth in claim 2, wherein said bevel has an angle in the range of about 45° to 60°.

4. A flowmeter as set forth in claim 1, wherein said assembly further includes a rectangular vane mounted at the end of a flexible beam cantilevered from the rear face of the block whereby said vane is caused by said vortex shedding to vibrate at said frequency, said vane lying in a plane at right angles to said front face.

5. A flowmeter as set forth in claim 5, wherein the distance between the rear face of the block and the leading edge of the vane is about 1 to 1¼ the internal diameter of said tube.

6. A flowmeter as set forth in claim 4, wherein the vibrations of said vane are mechanically transmitted to the outside of the tube by a rod passing through said beam and linked to a probe passing through said block and terminating in an external head which is engageable by a force sensor.

* * * * *